(12) United States Patent
Martin et al.

(10) Patent No.: US 6,914,371 B2
(45) Date of Patent: Jul. 5, 2005

(54) GLASS SPACER

(75) Inventors: Dorethee Martin, Suresnes (FR); Rene Gy, Bondy (FR); Didier Jousse, Taverny (FR)

(73) Assignee: Saint-Gobain Glass France, Courbevoie (FR)

(*) Notice: Subject to any disclaimer, the term of this patent is extended or adjusted under 35 U.S.C. 154(b) by 0 days.

(21) Appl. No.: 10/204,988

(22) PCT Filed: Mar. 7, 2001

(86) PCT No.: PCT/FR01/00680

§ 371 (c)(1),
(2), (4) Date: Oct. 29, 2002

(87) PCT Pub. No.: WO01/66478

PCT Pub. Date: Sep. 13, 2001

(65) Prior Publication Data

US 2003/0137230 A1 Jul. 24, 2003

(30) Foreign Application Priority Data

Mar. 7, 2000 (FR) .......................... 00 02936

(51) Int. Cl.⁷ ............................... C03C 4/14
(52) U.S. Cl. ..................... 313/292; 313/238
(58) Field of Search ................. 313/238, 250, 313/257, 292, 283; 501/32, 17

(56) References Cited

U.S. PATENT DOCUMENTS

| | | | |
|---|---|---|---|
| 3,093,598 A | * 6/1963 | McMilan et al. ........... 313/461 |
| 3,342,753 A | 9/1967 | Trap et al. ................. 252/518 |
| 4,065,317 A | * 12/1977 | Baak et al. ................. 501/70 |
| 4,366,252 A | * 12/1982 | Weaver ....................... 501/62 |
| 5,675,212 A | 10/1997 | Schmid et al. ............. 313/422 |
| 6,150,027 A | * 11/2000 | Yamamoto et al. ......... 428/426 |
| 6,586,867 B2 | * 7/2003 | Morishita et al. ........... 313/292 |

FOREIGN PATENT DOCUMENTS

| EP | 0 627 389 | 12/1994 |
|---|---|---|
| WO | WO 99/56302 | 11/1999 |

OTHER PUBLICATIONS

Shackelford et al., CRC Materials Science and Engineering Handbook, 3rd edition, 2001, Tables 224, 223, 40, 41, 116.*

Petrovykh, N.V., "Conducting Glass Materials," Enterprises and Institutes, *Glass and Ceramics,* U.S. Consultants Bureau, New York, vol. 50, No. 11/12, Nov. 1, 1993, pp. 501–503.

* cited by examiner

Primary Examiner—Nimeshkumar D. Patel
Assistant Examiner—Sharlene Leurig
(74) Attorney, Agent, or Firm—Oblon, Spivak, McClelland, Maier & Neustadt, P.C.

(57) ABSTRACT

The subject of the present invention is a glass spacer intended to keep two substrates spaced apart, its glass matrix having a volume electronic conductivity advantageously between $10^{-13}$ and $10^{-5}$ ohm$^{-1} \cdot $cm$^{-1}$.

According to a variant of the invention, the glass spacer has a modulus of elasticity of greater than 90 GPA.

22 Claims, 5 Drawing Sheets

GLASS SPACER

FIELD OF THE INVENTION

The invention relates to a glass spacer, intended to keep two flat substrates separate, and the glass composition of which ensures the durability of its "invisibility", or more precisely its low visibility, while it is being used.

BACKGROUND OF THE INVENTION

Although the invention is not limited to such applications, it will be more particularly described with reference to spacers used for keeping a space between two glass sheets in the production of field-emission screens, and therefore for keeping a space of limited thickness, generally of less than a few millimeters, over the entire surface of the glass sheets.

Such a configuration is widely sought for producing display screens, whatever the technology thereof. These may be field-emission display (FED) screens mentioned above, such as microdot screens, or plasma screens. Such a configuration may also be sought for producing vacuum glazing units or flat lamps. The expression "flat lamps" should be understood as encompassing lamps which may have a curvature over at least part of their surface, whatever the technology of these lamps.

This is because, in a screen of the field-emission type, a limited space in which a vacuum is created must be maintained between the two glass sheets. Deposited on the glass sheet forming the front face, which constitutes the anode, are the light-emitting elements. Placed on the rear face, which constitutes the cathode, are electron-emitting elements, the electrons being accelerated toward the light-emitting elements and thus exciting them.

It is known, as described in document WO-81/01910, that this type of screen, more particularly the outer glass sheet, that is to say the glass sheet which is seen by an observer, must have a high optical transparency.

The spacers for keeping a space between the two glass sheets must consequently be the least visible possible.

A process has already been proposed, according to document EP-0 627 389 A, for manufacturing a glass polyhedron in which a preform of polygonal cross section, advantageously polished on all its lateral faces, is firstly drawn and then cut into several rods, which rods, after having been joined together, are in turn cut to the desired length and then their ends are polished.

This technique is advantageous in so far as it allows, for the least cost, glass spacers to be produced to dimensions which are however quite difficult, each of these glass polyhedra having very small dimensions directly equal to those required by the intended application.

This is because, in the case of display screens, such as microdot screens, the spacers must be placed very precisely on separating or "black matrix" strips. These separating strips are provided either in one direction or in two perpendicular directions, in order to define the color pixels. The spacers must be placed so that they do not encroach on the pixel regions.

The spacers thus positioned on the separating strips must not be visible through the outer glass sheet, that is to say the glass sheet which faces the observer, especially in the case of a display screen.

Nevertheless, it is apparent that, when display screens are being used, the positions of the spacers become visible by the appearance either of bright areas or of dark areas around said spacers. Of course, in the particular case of display screens, this phenomenon disturbs the quality of the image and therefore cannot be tolerated. This brightening and/or darkening phenomenon around the spacers is known already and explained. This phenomenon is in fact due to the implantation of charges in the spacer because of the secondary emission coefficient of the material, said coefficient being defined by the ratio of the number of secondary electrons re-emitted to the number of primary electrons received; a coefficient differing from 1 results in a local charging effect which, depending on whether the charge is positive or negative, results in a brightening or darkening effect due to the deviation of the electron path.

Spacers made of glass with standard compositions, exhibiting ionic conduction, do not allow electronic charges to be removed. Furthermore, these compositions may include elements which readily migrate under the influence of an electric field or owing to the temperature. It is therefore possible to reveal the migration of constituent elements from the glass matrix during, for example, the production of a screen because of the thermal cycles or else during its use because of the electric fields which then exist. However, the migration of these elements may result in contamination of, for example, the microdots in the case of this type of screen.

One solution, already proposed, for avoiding this drawback associated with a local charging effect consists in producing a surface coating on the spacer in order to obtain electronic conduction. This type of solution has the drawback of being very expensive since it requires the spacer to be treated after it has been manufactured. Furthermore, in the case of spacers of complex shapes, the layers are difficult to produce homogeneously, especially in terms of thickness, and may lead to irregularities in charge removal; again, this results in the risk of a breakdown.

The inventors were thus tasked with producing spacers which fulfil their function of keeping, for example, two flat substrates apart and which remain barely visible during the use of the product for which they are used, without having the drawbacks, especially in terms of costs, of the existing solutions.

SUMMARY OF THE INVENTION

This objective is achieved according to the invention by a glass spacer, intended to keep two substrates spaced apart, the glass matrix of which exhibits volume electronic conductivity. This electronic conductivity property of the spacers, which is satisfactory for permitting the removal of charges, maybe demonstrated by an experiment using a scanning electron microscope. This experiment, the details of which will be given later, shows in the case of satisfactory electron conductivity that no brightness inhomogeneity over the image occurs.

Preferably, the electronic conductivity is between $10^{-13}$ and $10^{-5}$ $ohm^{-1} \cdot cm^{-1}$ and preferably between $10^{-12}$ and $10^{-8}$ $ohm^{-1} \cdot cm^{-1}$ at 50° C.

The conductivity is measured on glass specimens 1 mm in thickness by applying a voltage between two platinum electrodes having dimensions of 2×3 $mm^2$, placed opposite each other on either side of the specimens; the DC voltage applied is varied between −100 and 100 volts and a linear variation in the current with the voltage is observed. Furthermore, the measurements were checked for temperatures varying from 50 to 250° C. Electronic conductivity is then distinguished from ionic conductivity either by measurements at various frequencies and at various temperatures, or by observing the change in conductivity when the specimens are subjected to a DC voltage of 100 volts and a temperature of 200° C. In the case of an ionically conducting specimen, a rapid decrease in the conductivity as a function of time is observed. This reduction in conductivity is due to the mobility of the ions, which easily migrate in the electric field, for example Na ions. In contrast, in the case of an electronically conducting specimen, the conductivity is largely stable over time.

The spacer thus produced according to the invention makes it possible to remove the charges which appear on its surface. Such a spacer, the electronic conductivity of which is obtained in the bulk, therefore has not undergone an expensive subsequent treatment, such as the deposition of a layer, in order to obtain this property and is therefore produced more economically than that known hitherto.

Such a spacer also has the extremely advantageous property that, when the glass spacer is used to separate two glass sheets belonging to a field-emission display (FED) screen, any risk of a so-called "breakdown" effect is avoided. This is because the breakdown effect results from an accumulation of charges and occurs between the terminals of an insulating element. However, the spacer according to the invention, which permits the removal of the charges and thus establishes a leakage current, prevents any risk of a breakdown. This electronic conduction of the spacers also has the advantage of avoiding an electrostatic charge on said spacers while they are being stored. The inventors have also demonstrated that spacers, such as those produced conventionally, tend to easily become electrostatically charged during their storage, which makes the subsequent operations of placing them difficult, for example on a screen. The spacers according to the invention make it possible to avoid this type of drawback.

However, for energy efficiency reasons, the power lost through electronic conduction of the spacers must remain less than a fixed value; this is, for example, between 1 and 50 W/m² for microdot screens.

The spacers according to the invention are preferably made from a glass matrix comprising at least 1% of oxides of transition elements existing in several oxidation states. The glass matrix of the spacers according to the invention advantageously comprises the constituents below in the following molar proportions:

| | |
|---|---|
| $SiO_2$ | 25–75% |
| $Al_2O_3$ | 0–40% |
| $ZrO_2$ | 0–10% |
| $R_2O$ | 0–10% |
| R'O | 0–40% |
| Oxides of transition elements existing in several oxidation states | 1–30% | where R = Li, Na, or K and
R' = Mg, Ca, Sr or Ba.

According to the invention, the expression "transition elements" is understood to mean the transition elements of the Periodic Table. They include in particular certain rare earths which may exist in several oxidation states.

$SiO_2$ is a network-forming oxide; its content will advantageously be less than 73% in order to reduce the melting point and prevent excessively rapid degradation of the refractories making up the furnace. Moreover, its content will preferably be less than 55% when it is desired to give preference to the mechanical properties, especially the modulus of elasticity, of the spacers which will be produced. Below 25%, the stability of the glass becomes insufficient and the risk of devitrification increases. $Al_2O_3$ provides the glass matrix with a stabilizing role and especially allows the risk of devitrification, particularly for low silica contents, to be limited. Above 5%, the oxide advantageously contributes to improving the mechanical properties, especially the modulus of elasticity, of the spacers. Its content is advantageously less than 35% and preferably less than 20% so that the viscosity of the glass matrix at high temperature is not too great.

$ZrO_2$, like $Al_2O_3$, allows the strain point temperature to be increased, this being important especially in the case of spacers intended for screens which undergo heat treatments during their manufacture. However, unlike $Al_2O_3$, this oxide does not increase the viscosity of the glass matrix at high temperature. Its content does not exceed 10% and preferably 8% in order to simplify melting and to limit the risk of devitrification.

As regards the alkali metal oxides, these are introduced into the glass matrix essentially for glass production conditions and more particularly for keeping the melting point and the high-temperature viscosity within acceptable limits and for improving the homogeneity of the composition during melting. Their content is advantageously maintained below 10% and more preferably between 5%, because of their mobility which could disturb the desired electronic conductivity. Advantageously, the presence of the oxide $Li_2O$ is favored when mechanical properties, especially the modulus of elasticity, are sought, it being possible, optionally, for the oxides $Na_2O$ and $K_2O$ to be completely absent from the matrix. However, when economic constraints are essential, the oxide $Li_2O$ may be absent from the matrix, this oxide being more expensive than the others. An alkali metal oxide content of less than 1% is advantageously required in order to obtain adhesion of the "anodic bonding" type, which adhesion will be discussed below.

As regards alkaline-earth metal oxides, these are introduced for reasons similar to those of alkali metal oxides and they furthermore allow the stability of the glass with respect to the risk of devitrification to be improved and allow the strain point temperature to be increased. The oxides MgO and CaO are especially favored when a high modulus of elasticity is sought. Heavy oxides, such as SrO or BaO are especially favored for limiting the mobility of the alkali metal ions and consequently for reducing the ionic conductivity and preventing the risk of contamination, for example of screens, by alkali metal ions.

The invention also provides for the oxide $B_2O_3$ to be able to be introduced in contents not exceeding 10% and advantageously less than 5% in order to preserve satisfactory mechanical properties, and especially a satisfactory modulus of elasticity. $B_2O_3$ makes it possible in particular to improve the homogeneity of the composition during melting and reduces the melting point of said composition, when it substitutes for $SiO_2$. It also allows the high-temperature viscosity to be reduced. According to another variant of the invention, the glass matrix is of the borosilicate type and the $B_2O_3$ content is then greater than 8% and preferably greater than 10%.

The oxide $P_2O_5$ may also be used in contents not exceeding 5%, in particular to reduce the high-temperature viscosity without excessively degrading the mechanical properties, especially the modulus of elasticity, of the spacers.

The oxides $TiO_2$ and ZnO may also be used for reasons similar to those mentioned in the case of $B_2O_3$ and $P_2O_5$, especially in terms of regulating the melting parameters of the glass compositions. Their presence will be particularly favored when it is desired to obtain improved mechanical properties, and especially a higher modulus of elasticity.

The oxides of transition elements are oxides of the transition elements chosen especially from the following elements: Ti, V, Cr, Mn, Fe, Co, Ni, Cu, Nb, Mo, W, Ta, Re, Ru, Os, Rh, Ir. The sum of their contents is advantageously intended to be greater than 5%. The invention also provides for the introduction of oxides of rare earths which may exist in several oxidation states, especially such as Ce, Pr, Nd, Sm, Eu, Tb, Dy, Tm, Yb.

The redox of the glass, that is to say the respective proportions of each of the possible oxidation states of each of the cations, is controlled by controlling the relatively reducing nature of the melt atmosphere, by the temperature of the melt and possibly by the insertion of reducing elements such as coke or the like, for example a gas, into the melt. Controlling the redox in this way will in particular make it possible to control the electronic conduction so that it permits charge removal while limiting energy losses. Furthermore, for the purpose of improving the energy efficiency, the invention advantageously makes provision to limit, or even eliminate, electronic conduction of the spacers in the core, only maintaining electronic conduction on the surface. Such a result may be achieved according to the invention in the following manner: the glass matrix is melted in an oxidizing atmosphere in such a way that all the transition elements present are in their highest oxidation state. Then, during conversion into a spacer or else once the spacer has been obtained, the faces of the latter are made conducting by annealing in a reducing atmosphere.

The type of reducing atmosphere and the temperature and duration of the annealing make it possible to regulate the electronic conductivity and the surface thickness in which electronic transport will take place.

According to the invention, the addition of transition elements may have another advantage. This is because, when these transition elements have a strong coloring power, for example in the case of the elements Fe and Cr, it is possible to obtain a black appearance, at least as regards the cross section of the spacers which is seen through the substrate on which they are deposited. This black appearance may allow, in the case of certain screens, the spacer to be considered as a constituent element of the black matrix, that is to say of the black matrix which defines the pixels and which corresponds to the region in which the spacers are fixed, hence it is then possible to fix the spacers directly onto the substrates without an intermediate "bonding" material. A first option is then to insert the spacers into the black matrix in which a region has been hollowed out beforehand, for example by photolithography, in order to expose an impression having dimensions barely greater than those of the spacer. This operation may be sufficient for the spacer to be fastened to the substrate in so far as the inventors have observed that molecular bonding results from bringing the polished ends of the spacer into contact with the firepolished surface of the substrate, to the point that the spacers do not become detached when the substrate is turned upside down. A second option, possibly implemented simultaneously with the previous one, consists in fixing the spacer to the substrate by anodic bonding, that is to say in applying a given electric field and a given temperature in order to establish a chemical bond between the two materials, in so far as alkali metal ions are present in the glass matrix of the spacer.

Other additional elements may be present in the glass matrix, with contents of less than 1%. They are introduced, for example, to facilitate the melting and refining (As, Sb, F, Cl, $SO_3$, etc.) or else they are introduced in the form of impurities into the batch materials used or of impurities resulting from wear of the refractories.

The spacer thus defined according to the invention has a resistance to the passage of current, between for example two dark sheets, of between $10^{-5}$ G$\Omega$ and $10^{-7}$ G$\Omega$, preferably between $10^{-5}$ G$\Omega$ and 200 G$\Omega$, more preferably between 0.1 G$\Omega$ and 200 G$\Omega$, more preferably between 0.5 G$\Omega$ and 200 G$\Omega$ and more preferably between 1 G$\Omega$ and 100 G$\Omega$ and advantageously equal to 10 G$\Omega$. Such spacers thus allow charge removal and prevent any appearance of brightening or darkening regions.

According to an advantageous variant of the invention, the glass matrix constituting the spacer has a modulus of elasticity of at least 90 GPa. Such a physical characteristic of the spacers gives them satisfactory mechanical properties in order to be used between two flat substrates for the applications already mentioned above such as, for example, the production of screens or flat lamps. This is because the inventors have demonstrated that the modulus of elasticity is the property of the spacers, especially when the latter are produced according to the process described in document EP 0 627 389 A, which determines the mechanical strength of the spacers when they are subjected to the pressure exerted by the flat substrates, forming a screen for example, between which a vacuum is created. It was customary hitherto to believe, as document U.S. Pat. No. 5,675,212 illustrates, that the predominant factor determining the strength of the glass spacers for these applications was the presence of microcracks on the surface of the spacers. Thus, the inventors have demonstrated that, in particular in the case of spacers produced according to the process described in document EP 0 627 389 A, the mechanical properties of the spacer depend directly on its elastic instability and therefore on its modulus of elasticity; they interpret this phenomenon by a particularly remarkable surface state of the spacers after manufacture according to this process, without any other intervention; that is to say that the spacers produced according to this process are free of defects that can cause fracture when they are subjected to the stresses associated with their applications.

It should be noted that this characteristic relating to the modulus of elasticity is presented in association with the electronic conductivity of the glass matrix, especially because it has particular advantages for it as will be explained later. However, this characteristic relating to the modulus of elasticity, as it is, independently of the electronic conductivity, is also particularly beneficial for applications of such spacers. We also note that this characteristic relating to the modulus of elasticity is also beneficial for other applications, that is to say for producing glass products other than spacers.

Modulus of elasticity values which may be up to 140 GPa may be obtained according to the invention by introducing rare earths into the glass matrix. Preferably, the sum of the contents of rare earth oxides is greater than 1% and advantageously does not exceed 25%. The rare earth oxides are preferably chosen from the following: $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $TM_2O_3$, $Yb_2O_3$, $Lu_2O_3$.

The invention also advantageously provides for the introduction of nitrogen into the glass matrix. This introduction makes it possible according to the invention to obtain moduli of elasticity greater than 140 GPa and possibly up to 180 GPa. The nitrogen may be introduced during melting, by carrying out the melting in a neutral or reducing atmosphere, for example argon, nitrogen or a mixture of nitrogen and hydrogen. The nitrogen is then introduced into the batch materials in the form of $Si_3N_4$, AlN or BN. Nitrogen also has the advantage of making it possible to obtain spacers with a black coloration.

According to the invention, increasing the modulus of elasticity firstly allows manufacture without any risk of breakage, due to the elastic instability, in the production of screens, lamps or glazing units containing these spacers. This reduction in the risk of breakage is particularly notable in the case of FED screens in which the spacers are usually thin, especially having a thickness of less than 80 microns.

Furthermore, when the modulus of elasticity is high enough, it becomes possible to envision, for example in the case of thick substrates, that is to say those having a thickness of greater than 3 mm, or reinforced substrates, especially those reinforced by chemical treatment, to reduce the number of spacers installed per unit area in order to guarantee the necessary mechanical strength. Such a reduction in the number of spacers per unit area advantageously results in a saving when producing, for example, a display screen. Furthermore, this reduction in the number of spacers per unit area makes it possible to be able to increase the conductivity of the spacers since, their number being fewer, the overall energy loss may be maintained at an acceptable value while increasing the loss of each spacer taken individually; the role of the electronic conductivity, that is to say of avoiding charge build-up phenomena, is thus further improved.

Moreover, although the inventors have demonstrated that the modulus of elasticity is more important than the presence of microcracks in terms of mechanical strength, it is known that the geometry of the spacer has in particular an impact on its crush resistance. According to the applications envisioned, the spacers may be split into two families. Firstly there are spacers which may be termed "pillars"; these are frequently used for display screens and vacuum glazing units and flat lamps. There are then spacers which may be termed "ribs", because they are more elongate; these are frequently used for display screens.

With regard to the first family of spacers, that is to say those of the pillar type, these advantageously have according to the invention the shape of a right prism, the cross section of which is an orthogonal polygon and preferably the cross section of which is cruciform.

The spacers, whose glass matrices thus defined in particular include elements such as the rare earths, iron and alkaline-earth metals in non-standard proportions compared with more conventional compositions, have high densities, especially greater than 3. Such densities have the advantage of making it easier to handle and install the spacers. This is because the tendency is towards miniaturization of spacers, with a unit weight which may be less than 0.25 mg and may be as low as 0.09 mg. This low weight causes many problems: firstly, during manufacture of the spacers, the spacers have to be inspected individually and placed in a matrix used for shipping. To do this, robots provided with a gripper are used, and a higher weight of the spacer makes it easier for them to be freed. Moreover, during placement by the manufacturers of screens, flat lamps or vacuum glazing, individual handling may be employed as previously, or else a collective placement tool is used with a prior step which allows the spacers to be brought into predetermined impressions. Gravitational forces are systematically involved during these placement steps and an increase in the density is always favorable. Its impact on the final weight of the product will remain marginal, at most a few grams, since the density of spacers is generally between 500 and 10,000 per $m^2$.

It should be noted that this characteristic relating to the high density of the spacers is present in association with the electronic conductivity and/or with the modulus of elasticity of the glass matrix, especially because it has particular advantages for it, as was explained above. However, this characteristic relating to the density, as it is, independently of electronic conductivity and/or of the modulus of elasticity, is also particularly beneficial for applications of such spacers. Furthermore, the invention should not be understood as being limited to the addition of the aforementioned oxides capable of increasing its density, rather it extends to any additional element able to contribute to increasing the density of the spacers.

According to an advantageous embodiment of the invention, the glass matrix has a temperature corresponding to the strain point, that is to say a temperature below which the glass no longer exhibits viscous behavior, of greater than 530° C. and preferably greater than 550° C. Such values make it possible for the spacers to be made compatible with the temperatures to which, for example, microdot screens are exposed during their manufacture, especially during peripheral sealing.

Also advantageously, the glass matrix according to the invention has an expansion coefficient, measured between 20 and 300° C., of between 60 and $95 \times 10^{-7}$ $K^{-1}$, preferably between 80 and $95 \times 10^{-7}$ $K^{-1}$ and more preferably greater than $85 \times 10^{-7}$ $K^{-1}$. Such expansion coefficients allow the spacers to be made compatible with the other constituent elements, for example of screens such as the substrates or the layers deposited on these substrates. Such expansion coefficient values are particularly beneficial in the case of spacers of the "rib" type. In the case of borosilicate-type glass matrices, the expansion coefficient may be between 30 and $50 \times 10^{-7}$ $K^{-1}$.

Such compositions may be easily melted and converted into a spacer, especially using the technique described in document EP-0 627 389 A. That document describes a process which consists in drawing a glass preform or rod having a cross section with a shape approximately identical to that which it is desired to obtain to within a homothetic ratio. This preform has a large enough size to be able to be accurately machined to the desired cross section. In addition, this preform can be initially polished on its lateral faces. This drawing step takes place with the temperature of the preform raised to a temperature close to its softening temperature and the actual drawing can then take place in one or more steps.

The drawn rod obtained after drawing the preform has a cross section with a shape similar to that of the preform, to within a homothetic ratio, which corresponds to the cross section of the desired spacers. Moreover, the rod has a polished appearance on its lateral faces because it passes through a high temperature which creates a "fire polish". This phenomenon may allow the use of a preform not polished on its lateral faces but having another appearance, such as a "finely ground" appearance. The invention refers, through the term "fire polish", to a surface roughness (rms value) of less than 5 Å measured by AFM (atomic force microscopy) on a scanned area of approximately 6 $\mu m^2$. Preferably, this roughness is of the order of 2 Å. As mentioned above, the inventors have been able to demonstrate that the "fire polish" of the faces of the spacer thus obtained results in the mechanical strength of said spacers being defined by their yield strength and not by the presence of microcracks, as a person skilled in the art may have believed. Furthermore, the inventors have also demonstrated that the roughnesses thus obtained according to this process also contribute to reducing the risk of electrical breakdown; this is because breakdown initiation is favored by surfaces having asperities with small radii of curvature.

The rods are then bundled together so as to be mutually parallel. Preferably, these rods are bundled together in a cylinder, especially a glass cylinder, and are joined together using a binder such as wax or adhesive.

The bundle of rods is then cut to the required length so that they form the desired spacers.

Having obtained the length, the bundle of spacers may be ground and then polished at both ends. It is thus possible to obtain spacers polished on all their faces. In addition, if the cutting operation is not very precise, it is thus possible to rectify the length of the spacers during the polishing operation. Sharp edges, free of defects such as, for example, flakes, which could reduce the mechanical strength of the spacers, are thus obtained. This polishing also has the benefit of reducing the risk of breakdown for the same reasons as those mentioned above relating to the other faces. Furthermore, the state of these sections will allow better contact between the spacers and the layers deposited on the flat substrates and may thus possibly avoid the presence of an intermediate metal layer usually provided for ensuring better contact. These surface states furthermore advantageously permit molecular bonding by direct contact between the spacers and the substrate.

The spacers are then separated from one another, especially by melting the binder, or by chemical dissolution.

The process thus described makes it possible to obtain spacers with precise dimensions and at a lower cost. This is because the manual operations carried out by an operator are very limited. On the one hand, this reduces the production costs and, on the other hand, the operations which result in the dimensions, by not being manual, are both precise and regular.

According to one embodiment variant of these spacers, the rods are not cut to the desired length but constitute, as it were, a "stock" of spacers bound together. According to a first embodiment of this variant, the spacers may be sold or delivered in the form of reels or rolls formed from the uncut rod.

According to a second embodiment of this variant, the rod has transverse notches which define the spacers. These notches are obtained, for example, by a preferably rotating mechanical tool, of the diamond type, placed beneath the drawing mechanism.

Advantageously, these notches have an indentation shape. They may have a depth of at most 30% of the minimum width of the polygonal cross section. This depth may be at most equal to 20 $\mu$m and preferably at most 10 $\mu$m. The width of a notch is advantageously less than 20 $\mu$m.

This second embodiment variant is especially beneficial for applications in which the spacers do not need to be polished on all their faces, and more specifically on the sections of cuts.

The spacers according to the invention may also be produced using an extrusion method or a pultrusion method. The first method consists in producing the necessary preform before drawing using extrusion techniques and in drawing said preform using the technique described above. Pultrusion consists in drawing the preform directly at the exit of an extruder. According to these techniques, it appears to be unnecessary to polish the faces of the preform, while maintaining a satisfactory polished appearance of the faces of the spacers after drawing.

Moreover, the spacers obtained using these manufacturing methods are such that, for example in the case of a polygonal cross section, the vertices of the cross section are, because of the drawing process, rounded with a radius of curvature of between 2 and 10 microns and preferably between 5 and 10 microns. These rounded vertices make it possible, especially for certain applications, to reduce the risk of damage to the glass sheets and possibly to the layers deposited on their surfaces in the event of slippage, for example during placement of said spacers.

The pultrusion process furthermore dispenses with an intermediate step and especially with the storage of preforms, continuous feeding of the extruder resulting in continuous manufacture of the spacers for a given cross section. A final advantage of this pultrusion process is that it permits the orthogonality of the branches to be better controlled, for example in the case of a cruciform cross section.

According to an embodiment variant of the invention, the spacer is advantageously at least partly light-scattering; the scattering effect may advantageously be obtained by at least partly delustering the surfaces of the spacer.

Such a scattering property has an advantage, for example in the case of use in flat lamps or vacuum insulating glazing. In the case of display screens, this property may prevent parasitic reflections off the spacers, it being possible for said reflections to cause mixing of the colors generated by the pixels.

The delustered appearance may, for example, be obtained by etching in a bath of ammonium fluoride and hydrochloric acid. The treatment may be carried out at various stages of the manufacturing process, depending on the regions that it is desired to deluster. It may be carried out on the rod after drawing so that polished sections are maintained; it may be carried out after the spacers have been obtained, so as to deluster all of their surfaces; it may also be carried out at an intermediate stage, that is to say after cutting the spacers to length but when the latter are still embedded in a binder so as to deluster only the cross sections of said spacers. The surfaces thus delustered have a fine relief consisting of a juxtaposition as it were of small pyramids which create a light-trapping effect.

The spacers thus described according to the invention are particularly suitable for being used to produce display screens, such as plasma or microdot screens, or else to produce vacuum insulating glazing or flat lamps.

Furthermore, it appears that the glass compositions described for producing these spacers may be used for any application in which it is necessary to remove charges through a glass product and/or a modulus of elasticity as the invention describes is necessary.

BRIEF DESCRIPTION OF THE DRAWINGS

Further details and advantageous characteristics of the invention will become apparent below from the description of examples produced according to the invention and from the description of FIGS. 1 and 2, which represent, respectively:

FIGS. 2a', 2b', 2c' and 2d': gray level profiles obtained from the images shown in FIGS. 2a, 2b, 2c and 2d, passing through AA', BB', CC' and DD', respectively.

DETAILED DESCRIPTION OF THE PREFERRED EMBODIMENTS

Figure 1:
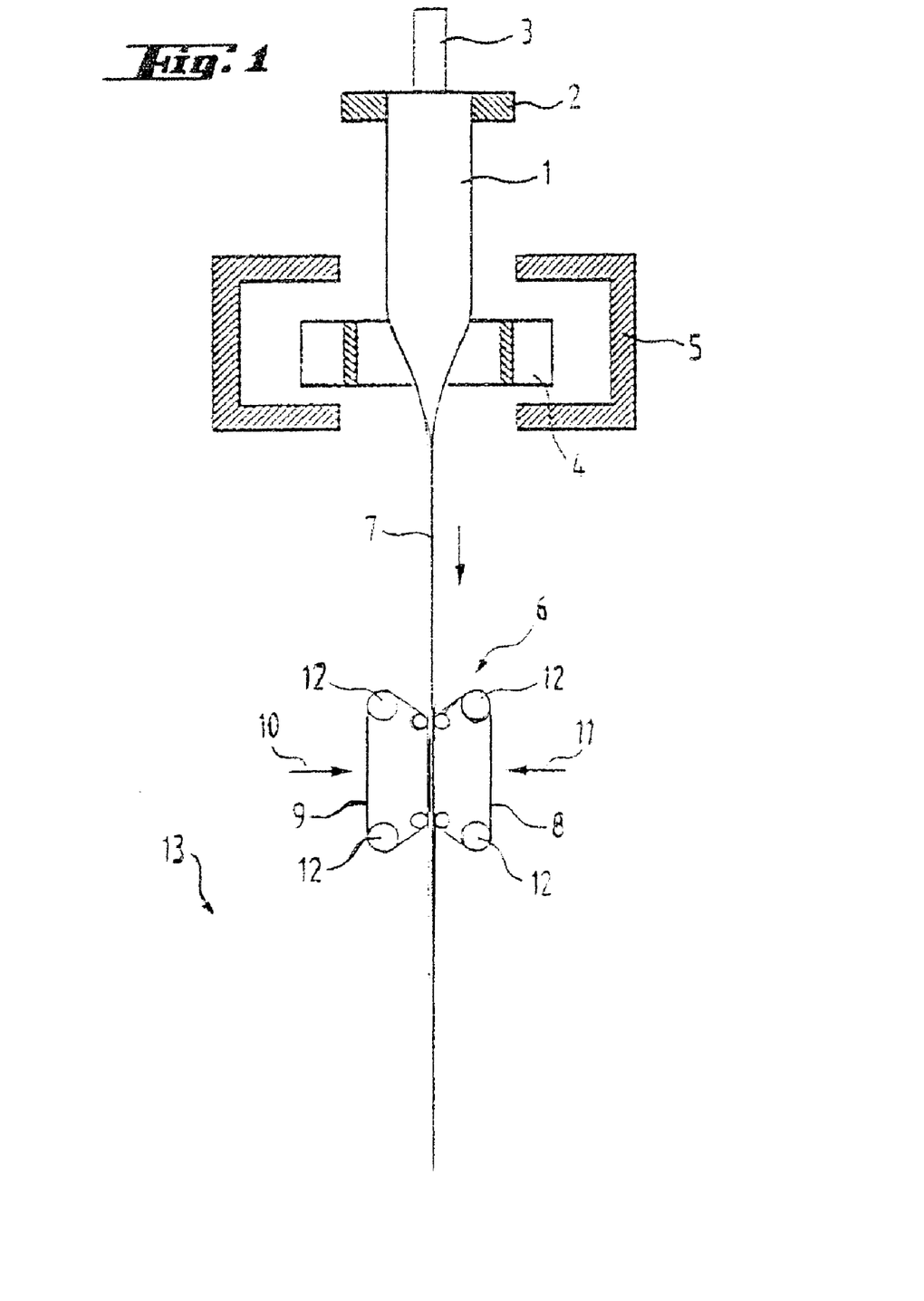
FIG. 1: a diagram of a device for producing spacers according to the invention.

FIG. 1 shows the diagram of a plant for producing spacers according to the invention.

A preform 1, in the present case of rectangular cross section, the dimensions of which are also given in the table below, is fixed to a support 2.

The support 2 is itself fixed to a mechanical system. This mechanical system 2, which may for example be an endless screw, allows the preform 1 to be given a vertical downward movement along the shaft 3, which preform may thus pass through a heating ring 4 approximately 70 millimeters in height.

This heating ring 4, shown in FIG. 2, is heated by low-voltage resistance heating and has a slightly oval shape. This allows better distribution of the heat around the preform such that the temperature is regulated to within plus or minus 0.1 degrees at 800° C.

The heating ring 4 is surrounded by an insulating refractory 5. A drawing device 6, placed at a distance of approximately 500 millimeters below the heating ring, allows the preform 1 to be drawn so as to obtain a glass rod or fiber 7.

The device 6 is composed of two driving belts 8, 9 on which lateral compressive forces 10, 11 are exerted. These compressive forces 10, 11 favor the drawing operation and are exerted via means (not shown) which are, for example, small pressure-adjustable hydraulic cylinders.

The draw rate is directly related to the speed of rotation of the rollers 12 which each drive the two driving belts 8, 9.

The driving belts 8, 9 are made of a material, for example silicone, which prevents them from slipping on the glass and therefore makes it possible to obtain uniform drawing.

Depending on the drawing process, it is possible to maintain virtually the same profile, i.e. the same cross-sectional profile, between the preform 1 and the glass rod 7, with a homothetic ratio between the two.

Spacers according to the invention have thus been able to be produced according to this manufacturing process.

Various spacers were thus produced according to the invention and their compositions, expressed as a molar percentage, are given in the table which follows.

Examples 1 and 2 are comparative examples which allow the advantages of the compositions according to the invention to be better understood.

| | 1 | 2 | 3 | 4 | 5 |
|---|---|---|---|---|---|
| $SiO_2$ | 71.7 | 73.0 | 63.3 | 45.3 | 52 |
| $Al_2O_3$ | 0.3 | 0.4 | 0.2 | 12.3 | 14 |
| $ZrO_2$ | | 2.1 | | | |
| $Li_2O$ | | | | 4.3 | 5 |
| $Na_2O$ | 12.6 | 4.7 | 2.7 | | |
| $K_2O$ | | 3.9 | | | |
| MgO | 6.1 | 0.2 | | 13.1 | 15 |
| CaO | 9.1 | 11.3 | | | |
| SrO | | 4.3 | 6.1 | | |
| BaO | | | 14.8 | | |
| ZnO | | | | 1.8 | 2 |
| $Y_2O_3$ | | | | 1.7 | 2 |
| $La_2O_3$ | | | | 8.7 | 10 |
| $Fe_2O_3$ | | | 11.5 | 11.3 | |
| $V_2O_5$ | | | 1.5 | 1.5 | |
| $\sigma$ ($\Omega^{-1} \cdot cm^{-1}$), at 50° C. | $3 \times 10^{-12}$ | $3 \times 10^{-17}$ | $8 \times 10^{-11}$ | $3 \times 10^{-9}$ | |
| E (GPa) | 73 | 77 | 81 | 110 | 107 |
| $T_{strain}$ (°C.) | 507 | 587 | 548 | | |
| $\alpha$ ($10^{-7}$ $K^{-1}$) | 84 | 79 | 81 | | 63 |
| Density | 2.50 | 2.64 | 3.51 | | 3.56 |

$\sigma$ indicates the electrical conductivity of the spacers and is expressed in $\Omega^{-1} \cdot cm^{-1}$; this is the sum of the ionic and electronic conductivities.

E expresses the modulus of elasticity or Young's modulus.

$T_{strain}$ is the strain point temperature corresponding to a viscosity of $10^{14.5}$ poise.

$\alpha$ is the expansion coefficient.

The modulus of elasticity was measured by four-point bending on test pieces having dimensions of 100×10×4 $mm^3$, produced from the compositions according to the invention. The bars from which the test pieces were then cut were firstly annealed for one hour at a temperature corresponding to a viscosity of $10^3$ poise and then brought back down to room temperature at 2° C./mn.

In order to compare the properties of the various glasses as regards their ability to remove charges of an electronic nature, the following measurement was carried out; this measurement demonstrates the electronic conductivity of the spacers produced with these glasses. It consists in placing a disk 10 mm in diameter and 1 mm in thickness, machined from the glass that it is desired to characterize. This disk is inserted into the analysis chamber of a scanning electron microscope, on a grounded metal specimen support. A first scan is carried out at high magnification (×20 000) with high-energy (31 keV) electrons for three minutes. An image at low magnification (×10) and at low energy (1 keV) of the region thus bombarded is then produced. If the glass has difficulty in removing the charges, the bombarded region has a bright appearance characteristic of the charging effect. In the most critical cases, an effect known by electron microscope users as a "mirror effect" is even observed: at the moment of taking the image, the incident electrons are reflected by the electrostatic field generated by the electrons implanted during the high-energy bombardment, which electrons could not be removed by the glass. The incident electrons consequently do not penetrate the specimen but produce an image of the electron gun. This observation is characteristic of a specimen which has great difficulty in removing charges of an electronic nature. If the glass removes the charges easily, no brightness inhomogeneity can be observed in the image.

Figure 2A:
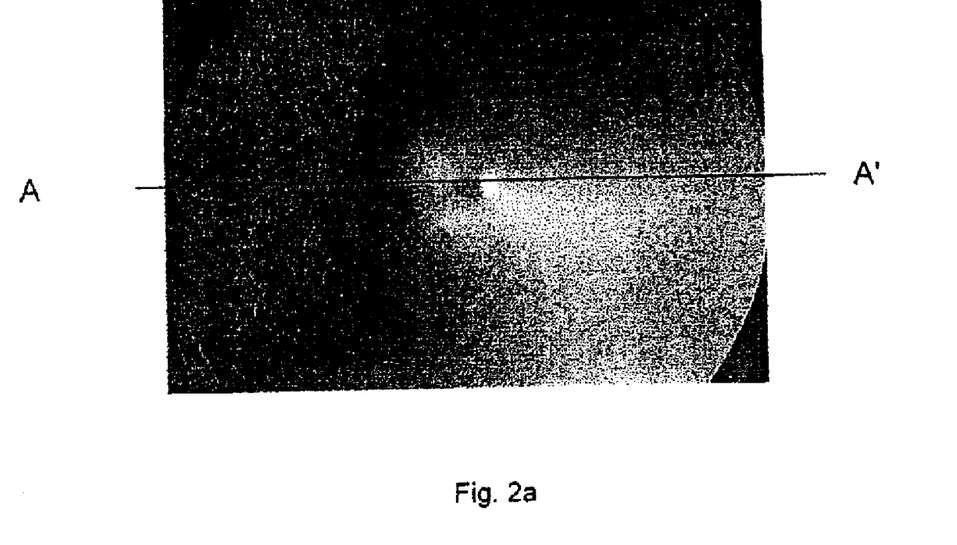
FIGS. 2a, 2b, 2c and 2d: images taken with a scanning electron microscope, illustrating the electronic conduction of various specimens according to the invention (FIGS. 2c and 2d) and control specimens (FIGS. 2a and 2b)
Figure 2B:
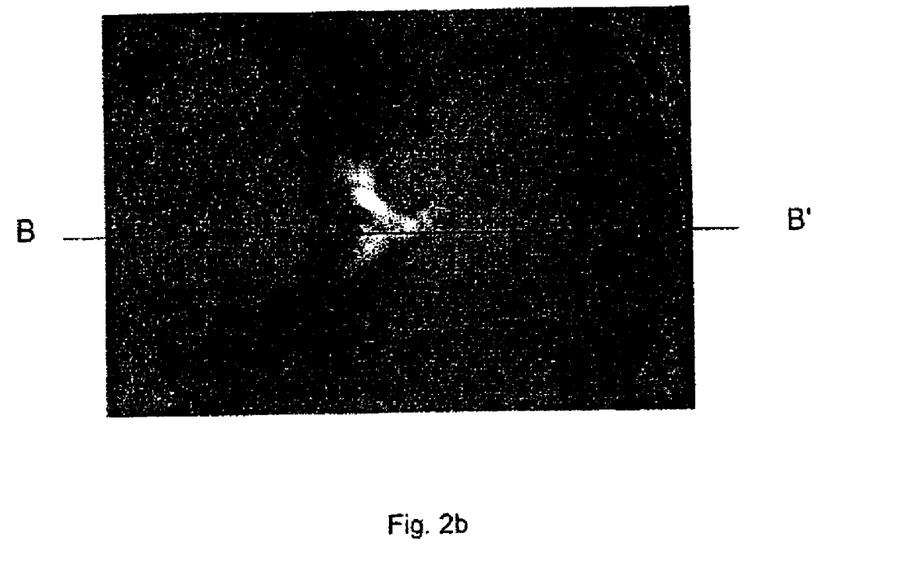

The results obtained for the various specimens are given in FIGS. 2a, 2b, 2c and 2d which show the results obtained for examples 1, 2, 3 and 4, respectively. FIGS. 2a and 2b, which correspond to the control examples, show that spacers produced from such compositions are poor electronic conductors, each of the photos showing a brightness effect, FIG. 2b demonstrating the "mirror effect" mentioned above. FIG. 2a moreover shows that even a relatively high ionic conductivity ($3 \times 10^{-12}$ $\Omega^{-1} \cdot cm^{-1}$) is not enough to allow charge removal. The brightness inhomogeneities due to insufficient charge removal are manifested by peaks in the profiles illustrated in FIGS. 2a' and 2b'.

Figure 2C:
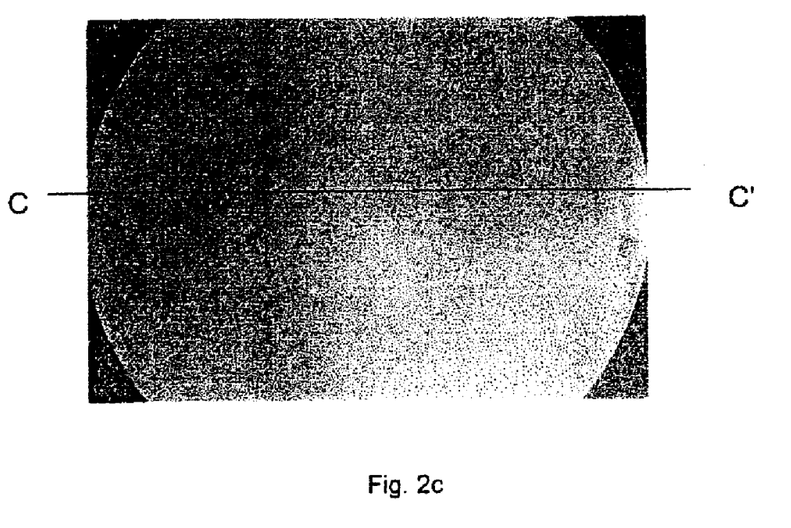
Figure 2D:
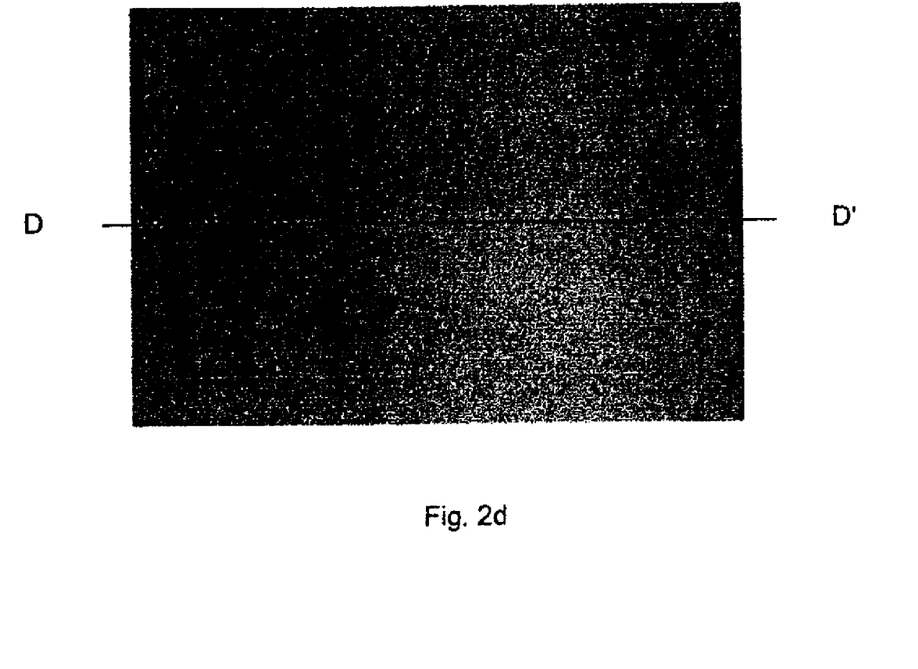

In contrast, FIGS. 2c and 2d, which are representative of compositions according to the invention, show that spacers produced from these compositions exhibit electronic conduction. The gray level profiles illustrated in FIGS. 2c' and 2d' reveal a continuous background free of peaks.

The spacers thus produced according to the invention, which have a satisfactory electronic conductivity, thus prevent charge build-up on said spacers, which may impair the quality of the product produced, for example a display screen. Furthermore, in the case of improved mechanical properties and more specifically improved modulus of elasticity as the invention proposes, it is possible to limit the number of spacers and thus make it possible to have spacers with a greater electronic conduction, and therefore again a product of better quality, while maintaining acceptable energy losses.

As regards example 5, this corresponds to a composition making it possible to obtain a high modulus of elasticity without, however, possessing a satisfactory electronic conductivity for the applications envisioned above. However, such a composition may be beneficial for other applications of spacers which do not need such an electronic conductivity.

What is claimed is:

1. A glass spacer maintaining a predetermined space between two glass substrates, comprising:
   a glass matrix which comprises silicon dioxide in an amount of from 25 to 75 percent based on molar proportions and
   one or more oxides of a transition element existing in several oxidation states in an amount from 1 to 30 molar percent;
   wherein said glass matrix has a volume electronic conductivity of between $10^{-13}$ and $10^{-5}$ ohm$^{-1}$·cm$^{-1}$.

2. The spacer of claim 1, wherein the glass matrix further comprises the following constituents in the following molar proportions: $Al_2O_3$ in an amount from 0 to 40 percent, $ZrO_2$ in an amount from 0 to 10 percent, $R_2O$ in an amount from 0 to 10 percent, $R^1O$ in an amount from 0 to 40 percent, wherein R is Li, Na or K and $R^1$ is Mg, Ca, Sr or Ba.

3. The spacer of claim 1, wherein the glass matrix contains the oxide $Li_2O$ in an amount greater than 1%.

4. The space of claim 1, wherein the glass matrix comprises at least 5% of the one or more oxides of a transition element existing in several oxidation states.

5. The spacer of claim 1, wherein the spacer has a modulus of elasticity of at least 90 GPa.

6. The spacer of claim 5, wherein the glass matrix comprises one or more rare earth oxides in a molar content between 1 and 25% based on molar proportions.

7. The spacer of claim 5, wherein the glass matrix further comprises nitrogen.

8. The spacer of claim 1, having a density of greater than 3 g cm$^{-3}$.

9. The spacer of claim 1, wherein the spacer is in the shape of a right prism having a cross section that is an orthogonal polygon.

10. The spacer of claim 9, wherein the cross section is a cruciform.

11. The spacer of claim 1, wherein the spacer has an electrical resistance between $10^{-5}$ GΩ and $10^7$ GΩ.

12. The spacer of claim 11, wherein the electrical resistance is between $10^{-5}$ GΩ and 200 GΩ.

13. The spacer of claim 12, wherein the electrical resistance is between 0.1 GΩ and 200 GΩ.

14. The spacer of claim 13, wherein the electrical resistance is between 1 GΩ and 100 GΩ.

15. The spacer of claim 14, wherein the electrical resistance is 10 GΩ.

16. The spacer of claim 1, wherein the spacer has a temperature corresponding to a strain point of greater than 530° C.

17. The spacer of claim 1, wherein the spacer has an expansion coefficient, measured between 20 and 300° C., of between 60 and 95×10$^{-7}$ K$^{-1}$.

18. The spacer of claim 1, wherein the spacer is at least partly scattering.

19. The spacer of claim 1, wherein the spacer is obtained by drawing a perform that has been machined or extruded or by pultrusion.

20. The spacer of claim 1, wherein the spacer has a polygonal cross section wherein the vertices of the polygonal cross section are rounded with a radius of curvature of between 2 and 10 microns.

21. The spacer of claim 20, wherein the vertices of the polygonal cross section have a radius of curvature of between 5 and 10 microns.

22. A plasma screen or microdot screen, which comprises:
   two flat substrates and
   a plurality of glass spacers as claimed in claim 1.

* * * * *